(12) United States Patent
Yasui

(10) Patent No.: US 6,370,968 B1
(45) Date of Patent: Apr. 16, 2002

(54) UNCONNECTED CAPACITOR TYPE TORQUE SENSOR

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,352

(22) Filed: Aug. 23, 1999

(30) Foreign Application Priority Data

Feb. 8, 1999 (JP) .......................................... 11-030681

(51) Int. Cl.⁷ ................................................ G01L 3/02
(52) U.S. Cl. ................ 73/862.337; 180/444; 73/862.08
(58) Field of Search ...................... 180/444; 73/862.331, 73/862.332, 862.333, 862.337

(56) References Cited

U.S. PATENT DOCUMENTS

| | | | |
|---|---|---|---|
| 2,432,900 A | 12/1947 | Jacobsen | |
| 2,737,049 A | 3/1956 | Waugh | |
| 2,754,683 A | 7/1956 | Waugh | |
| 4,676,331 A | * 6/1987 | Iwaki et al. ................. | 180/444 |
| 5,910,781 A | * 6/1999 | Kawamoto et al. .... | 340/870.37 |

FOREIGN PATENT DOCUMENTS

| | | |
|---|---|---|
| DE | 29 39 620 | 4/1981 |
| DE | 37 08 103 | 10/1987 |
| DE | 38 02 684 | 8/1988 |
| DE | 39 07 707 | 9/1990 |
| DE | 39 18 862 | 4/1991 |
| DE | 40 14 521 | 11/1991 |
| DE | 41 10 280 | 10/1992 |
| DE | 41 10 727 | 10/1992 |
| DE | 41 37 647 | 5/1993 |
| DE | 43 23 960 | 1/1994 |
| JP | 11-030681 | 2/1999 |

* cited by examiner

Primary Examiner—Benjamin R. Fuller
Assistant Examiner—Andre Allen
(74) Attorney, Agent, or Firm—Sughrue Mion, PLLC

(57) ABSTRACT

A torque sensor having a simple structure and free from a torque detection error.

The torque sensor comprises an elastic member for connecting a first shaft to a second shaft and generating torsion displacement between the first shaft and the second shaft according to torque between the first shaft and the second shaft, a ring-shaped movable electrode attached to the shafts so that it displaces in an axial direction according to a relative torsion angle between the first shaft and the second shaft, first and second fixed electrodes installed at locations where they do not turn together with the shafts, and detecting means for detecting capacitance between each of the first and second fixed electrodes and the movable electrode.

4 Claims, 6 Drawing Sheets

UNCONNECTED CAPACITOR TYPE TORQUE SENSOR

BACKGROUND OF THE INVENTION

1. [Field of the Invention]

The present invention relates to a torque detector for detecting torque when external force is applied to a rotation shaft without contact in a car power steering unit or the like.

2. [Description of the Prior Art]

In a car power steering unit, torque applied to a steering wheel must be detected to determine the amount of assist force. There is known a torque detector disclosed by Japanese Laid-open Patent Application No. 63-65331 as an example of the torque sensor used for this purpose of the prior art. The structure of this device will be described with reference to FIGS. 10 to 12.

In these figures, reference symbol 1A denotes a shaft to be measured, 10 and 11 a pair of electrode bases fixed to the shaft 1A, 12 and 13 electrodes fixed to the electrode bases 10 and 11, respectively, 16 a rotary transformer consisting of a rotary core 16a and a stationary core 16b, 17a and 18a cores embedded in the rotary core 16a, and 17b and 18b cores embedded in the stationary core 16b. As shown in FIG. 11, the electrode 12 consists of electrodes 12a to 12d and the electrode 13 consists of electrodes 13a to 13b, all of which are shaped like a fan with the center of the shaft 1A as the center thereof. An overlapped portion between the electrodes 12a and 13a form a capacitor C1, an overlapped portion between the electrodes 12b and 13a forms a capacitor C2, an overlapped portion between the electrodes 12c and 13b form a capacitor C3, and an overlapped portion between the electrodes 12d and 13b form a capacitor C4.

These capacitors are connected to one another to form a Wheatstone bridge circuit as shown in FIG. 12. The terminals "c" and "d" of the Wheatstone bridge circuit are connected to both ends of the coil 17a of the rotary transformer 16 and the terminals "a" and "b" are connected to both ends of the coil 18a of the rotary transformer 16. The coils 17b and 18b magnetically connected to the coils 17a and 18a are connected to an unshown detection circuit.

A description is subsequently given of the operation of the torque detector. When torque is applied to the shaft 1A from the steering wheel, the torsion deformation of the shaft 1A occurs and relative torsion displacement between the pair of electrode bases 12 and 13 occurs. For example, when the electrodes 13a and 13b displace in a clockwise direction with respect to the electrodes 12a to 12d in FIG. 11, the areas of the overlapped portions change, whereby the capacitance of each of the capacitors C1 and C3 decreases and the capacitance of each of the capacitors C2 and C4 increases. Since the Wheatstone bridge circuit is thereby imbalanced, an AC voltage eO is generated between the terminals "a" and "b" by supplying an AC voltage eB between the terminals "c" and "d". Since this voltage is proportional to the amount of torsion deformation of the shaft and the torque applied to the shaft, the torque is obtained from the voltage between the terminals "a" and "b".

Since the terminals "a" to "d" are connected to the detection circuit by the rotary transformer 16 without contact, a signal can be transmitted even when the shaft 1A turns.

SUMMARY OF THE INVENTION

Since the torque detector of the prior art is constituted as described above, to transmit a signal to the fixed detection circuit from a detection unit provided in the turning shaft 1A, the rotary transformer must be used as in the case above or a slip ring must be used in other known examples with the result that the torque detector becomes complex in structure.

In other torque detector of the prior art, a movable magnetic member is displaced by the twisting of a torsion bar or the shaft caused by torque and this displacement is obtained as a change in the inductance of a coil wound round the shaft.

Since the magnetic characteristics of the magnetic member such as a yoke or movable magnetic member used in the rotary transformer or the coil have temperature characteristics, a torque detection error is easily produced.

It is an object of the present invention which has been made to solve the above problems of the prior art to provide a torque detector having a simple structure and high accuracy.

According to a first aspect of the present invention, there is provided a torque detector for detecting torque which is applied between a first shaft and a second shaft arranged coaxial to each other in such a manner that one end of the first shaft faces one end of the second shaft, wherein the torque detector comprises an elastic member for connecting the first shaft to the second shaft and generating torsion displacement between the first shaft and the second shaft according to the torque between the first and second shafts, a ring-shaped movable electrode attached to the shafts so that it displaces in an axial direction according to a relative torsion angle between the first and second shafts, a fixed electrode installed at a location where its surface is opposed to the surface of the movable electrode and it does not turn together with the shafts, and detecting means for detecting capacitance between the fixed electrode and the movable electrode.

According to a second aspect of the present invention, there is provided a torque detector which comprises first and second fixed electrodes arranged on the same side of the movable electrode and detecting means for detecting capacitance between each of the first fixed electrode and the second fixed electrode and the movable electrode.

According to a third aspect of the present invention, there is provided a torque sensor which comprises a third fixed electrode arranged on a side opposite to the first and second fixed electrodes of the movable electrode.

The above elastic member has a first group of elastic columns which are inclined at a predetermined angle with respect to the first shaft and formed at predetermined intervals on a side where it is fixed to the first shaft and a second group of elastic columns which are inclined at the same predetermined angle in an opposite direction to that of the first group of elastic columns with respect to the second shaft and formed at predetermined intervals on a side where it is fixed to the second shaft. The movable electrode is supported between the first group of elastic columns and the second group of elastic columns directly or indirectly.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
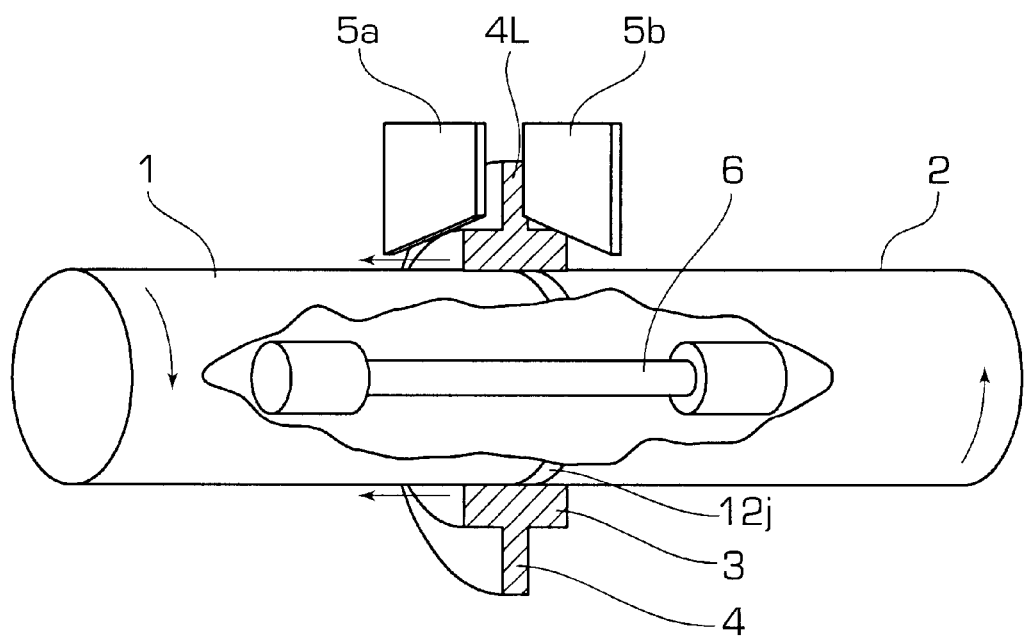
FIG. 1 is a perspective view of a torque detector according to Embodiment 1 of the present invention.

FIG. 1 is a schematic perspective view of a torque detector according to Embodiment 1 of the present invention. In the figure, reference numeral 1 denotes a first shaft connected to a steering wheel (not shown), and 2 a second shaft connected to the pinion gear (not shown) of a steering mechanism. The first shaft 1 and the second shaft 2 are arranged coaxial to each other with a predetermined interval therebetween in such a manner that one ends thereof face each other and connected to each other by a torsion bar 6 as an elastic member provided along the center axes of the shafts 1 and 2. Denoted by 3 is a ring which is installed at a joint 12j between the first shaft 1 and the second shaft 2 so that it displaces in an axial direction according to a relative torsion angle between the first shaft 1 and the second shaft 2, used to fix and support a movable electrode 4, formed cylindrical and made from an insulating material. Numeral 4 represents a ring-shaped movable electrode fixed and supported by the ring 3, having a hole at the center and made from a conductive material. That is, the movable electrode 4 is attached to the shafts through the ring 3 so that it displaces in an axial direction according to a relative torsion angle between the first shaft 1 and the second shaft 2. FIG. 1 gives a half cutaway view of the ring 3 and the movable electrode 4 to show their sectional shapes. Reference symbols 5a and 5b represent first and second fixed electrodes having surfaces opposite to the left side surface 4L shown in FIG. 1 of the movable electrode 4 (that is, two fixed electrodes arranged to face one surface of the movable electrode 4). The first fixed electrode 5a and the second fixed electrode 5b are fixed in a housing (not shown) for storing a detection circuit which will be described hereinafter (that is, the first fixed electrode 5a and the second fixed electrode 5b are provided at a location where they do not turn together with the shafts 1 and 2 and their electrode surfaces face the surface of the movable electrode).

Figure 2:
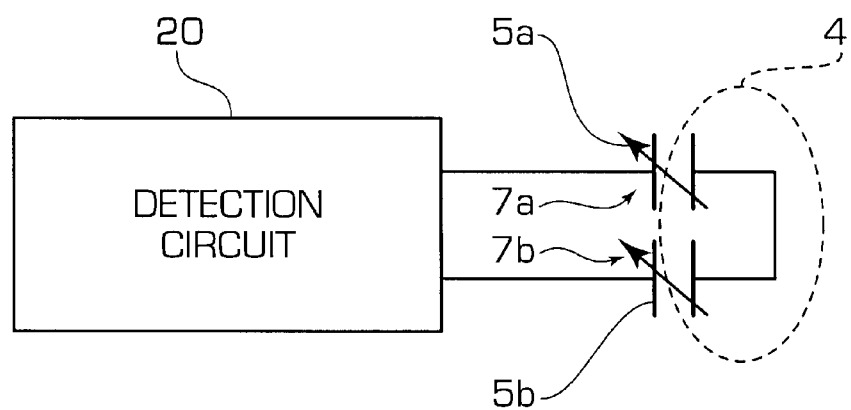
FIG. 2 is a circuit block diagram of the torque detector according to Embodiment 1.

FIG. 2 is a circuit block diagram of Embodiment 1. In the figure, 7a denotes a capacitor having capacitance Ca constructed by the fixed electrode 5a and the movable electrode 4, 7b a capacitor having capacitance Cb constructed by the second fixed electrode 5b and the movable electrode 4, and 20 a detection circuit.

A description is subsequently given of the operation of this Embodiment 1.

When torque in a right direction is applied between the first shaft 1 and the second shaft 2 as shown by an arrow in FIG. 1 by the operation of the steering wheel by a driver, the torsion bar 6 is twisted and torsion displacement occurs between the first shaft 1 and the second shaft 2. Then, the ring 3 displaces in a left direction as shown by arrows in FIG. 1 according to this relative torsion angle. At this point, the capacitance of each of the capacitors 7a and 7b increases because the distance between the electrodes reduces. Since the capacitors 7a and 7b are connected in series, capacitance between the first fixed electrode 5a and the second fixed electrode 5b increases. Therefore, by detecting capacitance between the first fixed electrode 5a and the second fixed electrode 5b by means of the detection circuit 20, the distance between the movable electrode 4 and the first fixed electrode 5a and the distance between the movable electrode 4 and the second fixed electrode 5b as well as the amount of given torque can be obtained.

The detection of capacitance may be carried out by known systems such as one for detecting and calculating a voltage change, one for detecting and calculating a current change, one for detecting and calculating a change in the resonance frequency of LC oscillation or CR oscillation, or a Wheatstone bridge system of capacitors by constructing the Wheatstone bridge circuit of capacitors as shown in Embodiment 2 which will be described hereinafter.

Figure 10:
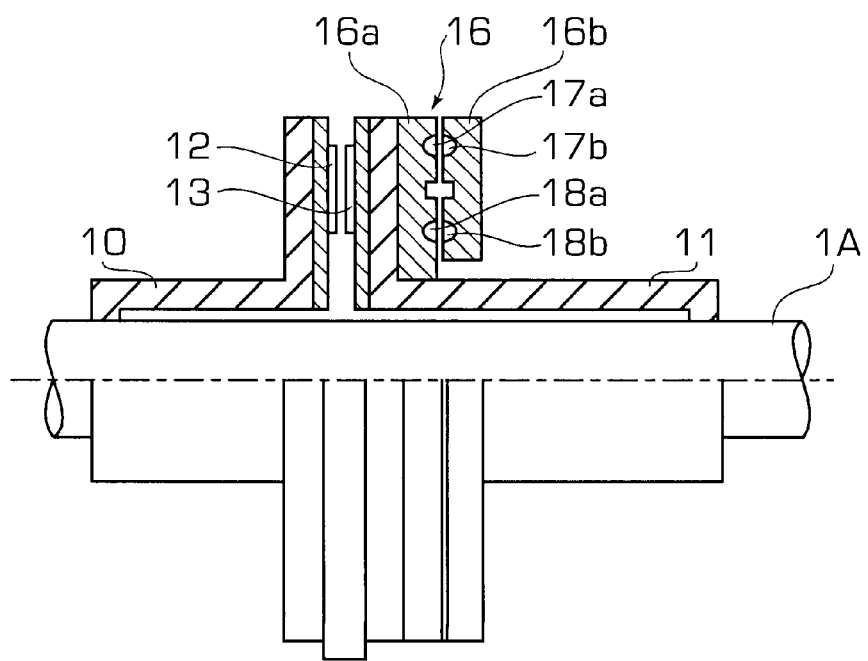
FIG. 10 is a partially front sectional view of a torque sensor of the prior art.
Figure 11:
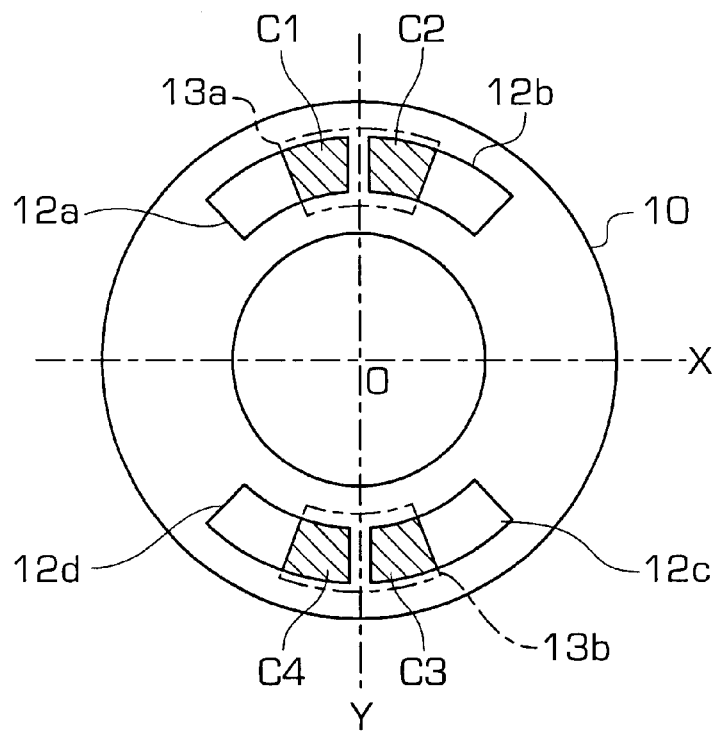
FIG. 11 is a side view of the electrodes of the torque sensor of the prior art.
Figure 12:
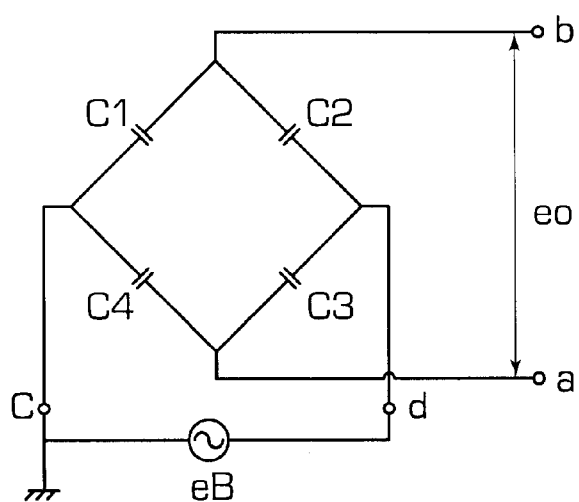
FIG. 12 is a circuit block diagram of the torque detector of the prior art.

In the prior art shown in FIGS. 10 to 12, since the both electrodes of the capacitor rotate together with the shaft, a rotary transformer is required to connect them to the detection circuit. According to Embodiment 1 of the present invention, even when the shafts 1 and 2 and the movable electrode 4 turn, the fixed electrodes 5a and 5b which are part of the detection unit (capacitors 7a and 7b constructed by the fixed electrodes 5a and 5b and the movable electrode 4) do not turn, thereby making it possible to eliminate the need of a rotary transformer or a slip rig to connect the detection unit to the detection circuit 20 and to obtain a torque detector having a simple structure.

Since a magnetic member is not used, the temperature characteristics of the magnetic characteristics of the magnetic member have no influence upon torque detection accuracy and a high-accuracy torque detector can be obtained.

Since the ring 3 has to move only in an axial direction, the ring 3 may be attached to the shaft apart from the joint 12j between the first shaft 1 and the second shaft 2.

Embodiment 2

A torque detector according to Embodiment 2 of the present invention will be described with reference to FIGS. 3 to 6. In each of the figures, the same or corresponding members or elements as those of FIGS. 1 and 2 are given the same reference symbols.

Figure 3:
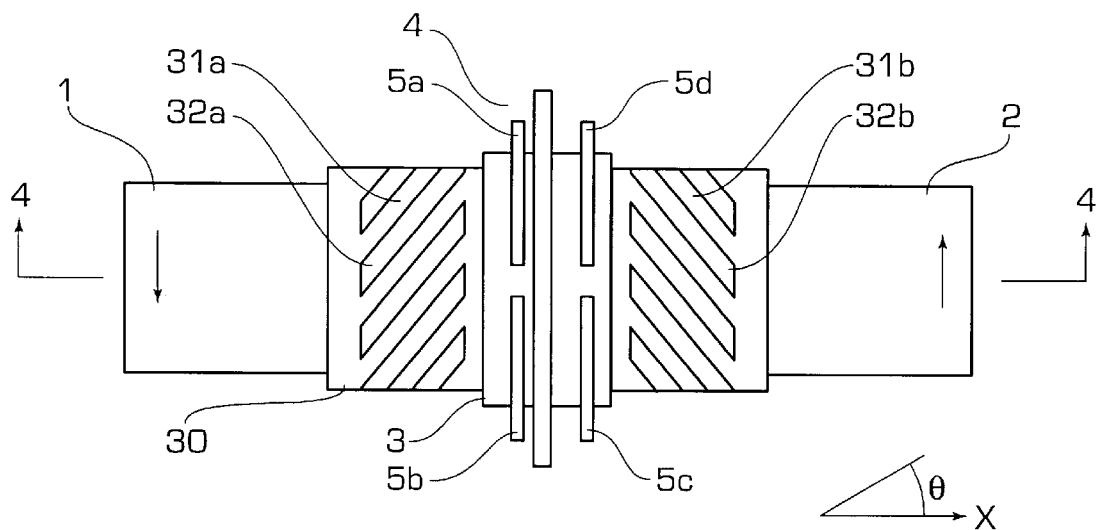
FIG. 3 is a top (plan) view of a torque detector according to Embodiment 2 of the present invention.
Figure 4:
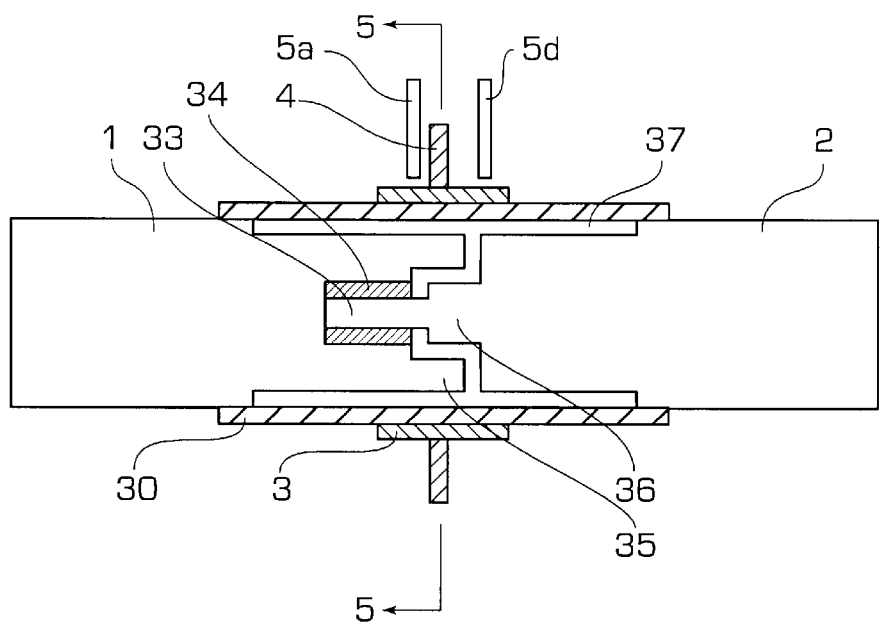
FIG. 4 is a front sectional view of the torque detector according to Embodiment 2.
Figure 5:
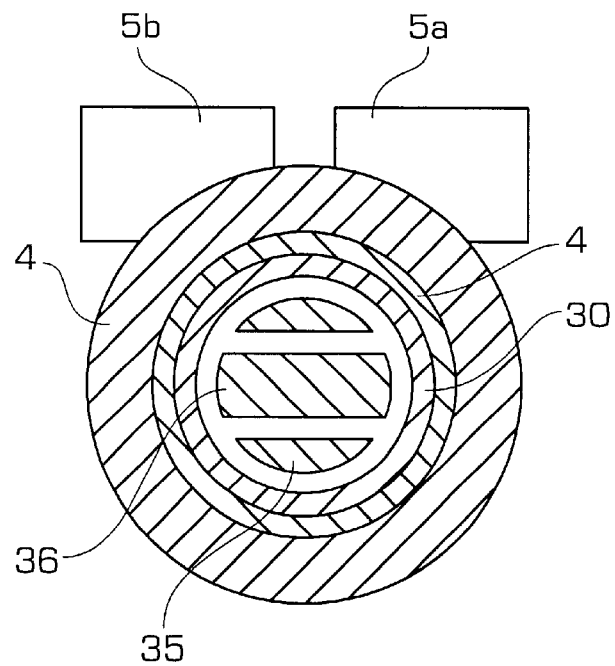
FIG. 5 is a side sectional view of the torque detector according to Embodiment 2.
Figure 6:
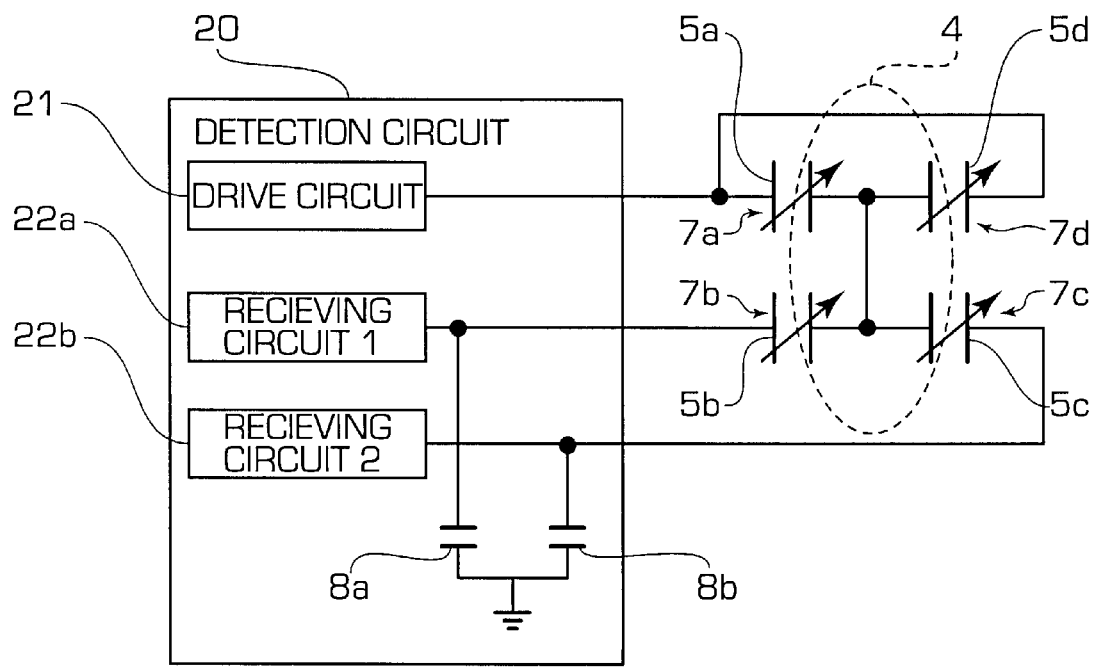
FIG. 6 is a circuit block diagram of the torque sensor according to Embodiment 2.

FIG. 3 is a top view of a torque detector according to Embodiment 2, FIG. 4 is a front sectional view cut on line A—A of FIG. 3, FIG. 5 is a side sectional view cut on line B—B of FIG. 4 and FIG. 6 is a circuit block diagram.

In FIGS. 3 and 4, reference symbols 5c and 5d denote third and fourth fixed electrodes which are symmetrical to each other and provided on a side opposite to the first and second fixed electrodes 5a and 5b of the movable electrode 4d.

Numeral 30 denotes a substantially cylindrical elastic member whose both end portions 30L and 30R are fixed to the first shaft 1 and the second shaft 2, respectively, and which is made from a metal. Reference symbol 31a indicates a first group of elastic columns which are inclined at a positive angle θ with respect to the first shaft 1 and formed at equal intervals on an end portion 30L side of the elastic member 30 by press punching a group of windows 32a. Reference symbol 31b indicates a second group of elastic columns which are inclined at a negative angle θ with respect to the second shaft 2 and formed at equal intervals on an end portion 30R side of the elastic member 30 by press punching a group of windows 32b. Numeral 33 denotes a cylindrical centering shaft provided at the end of the second shaft 2, and 34 a cylindrical bush, provided at the second shaft 2, for rotably supporting the centering shaft 33 to prevent the centers of the first shaft 1 and the second shaft 2 from shifting from each other. Denoted by 35 is a receiving portion of the first shaft 1 and 36 a projection portion of the second shaft 2. As shown in FIG. 5, the receiving portion 35 and the projecting portion 36 form a stopper for limiting rotation angle to prevent the elastic member 30 from being twisted excessively. The diameters on the connection sides of the first shaft 1 and the second shaft 2 are made slightly smaller than those on the other sides to form a gap 37 between the elastic member 30 and the first shaft 1 and between the elastic member 30 and the second shaft 2 as an escape when the elastic member 30 bends. The ring 3 and the movable electrode 4 are installed at the center of the elastic member 30 where the groups of widows 32a and 32b are not formed.

In FIG. 6, reference symbol 7c is a capacitor having capacitance Cc constructed by the third fixed electrode 5c and the movable electrode 4, 7d a capacitor having capacitance Cd constructed by the fourth fixed electrode 5d and the movable electrode 4, 21 a drive circuit for generating an AC voltage, and 8a and 8b capacitors connected to the fixed electrodes 5b and 5c, respectively. The capacitors 7b and 7c form a Wheatstone bridge circuit. Reference symbol 22a denotes a first receiving circuit connected to the capacitor 7b and the capacitor 8a, and 22b a second receiving circuit connected to the capacitor 7c and the capacitor 8b.

A description is subsequently given of the operation of this Embodiment 2.

When torque in a right direction is applied between the first shaft 1 and the second shaft 2 by the operation of the steering wheel by a driver as shown by an arrow in FIG. 3, as the first group 31a of elastic columns are forced down, the inclination angle θ increases, and as the second group 31b of elastic columns are pulled and raised up, the absolute value of the inclination angle θ reduces. Thereby, the ring 3 and the movable electrode 4 fixed to the ring 3 displace toward the left side. Therefore, the capacitance of each of the capacitors 7a and 7b increases and the capacitance of each of the capacitors 7c and 7d decreases as in Embodiment 1. Since the capacitors 7a and 7d are connected to the drive circuit 21 and the movable electrode 4 in parallel, when the obtained integrated capacitance is represented by Ct, the dielectric constant of the air by ξ, the areas of the portions where the fixed electrodes 5a to 5d face the movable electrode 4 are all equal and represented by S, and the distances between the fixed electrodes 5a to 5d and the movable electrode 4 are represented by La to Ld, respectively, the following relationships are established.

$Ca = \xi S/La$ $Cd = \xi S/Ld$ $Ct = 1/(1/Ca + 1/Cd) = \xi S/(La + Ld)$

Therefore, if the movable electrode 4 displaces, La +Ld does not change and hence, Ct does not change as well. However, since the capacitance Cb of the capacitor 7b forming the Wheatstone bridge increases and the capacitance Cc of the capacitor 7c decreases, when an AC voltage is applied from the drive circuit 21 through Ct, the amplitude of voltage input into the receiving circuit 1 expands and the amplitude of voltage input into the receiving circuit 2 shrinks. The displacement of the movable electrode 4 and the amount of given torque can be obtained by detecting the amplitude of this voltage.

In Embodiment 1, there is only one detection circuit. In Embodiment 2, there are two detection circuits. Therefore, if one of them fails, the other can be used as a back-up or can be used to detect a failure.

In Embodiment 1, the torsion bar 6 is used as an elastic member to displace the ring 3 in an axial direction according to a relative torsion angle between the first shaft 1 and the second shaft 2 . In Embodiment 2, the substantially cylindrical elastic member 30 which can be produced by pressing at a low cost is used to displace the ring 3 and the movable electrode 4 in an axial direction by directly attaching the ring 3 to the elastic member 30, thereby making production easy and reducing costs.

In the above Embodiment 2, the fixed electrode 5d is provided to form the capacitor 7d so as to achieve symmetricity. This is not always necessary, the fixed electrode 5d may be omitted to achieve a simpler structure, and driving may be effected through the capacitor 7a only.

In the above Embodiment 2, a portion devoid of windows is provided between the first group 31a of elastic columns and the second group 31b of elastic columns and the ring 3 is fixed in that portion. The groups 32a and 32b of windows may be made continuous to each other and the left ends of the elastic columns of the second group 31b may be connected to the right ends of the elastic columns of the first group 31a, respectively. In this case, it is slightly difficult to secure machining accuracy but the movement of the movable electrode against the same torsion deformation becomes larger and sensitivity becomes higher.

The above-described elastic member 30 may be made from a material having certain measures of strength and elasticity, such as rubber, ceramic, resin, wood or the like.

Since the elastic member 30 is made from a metal in Embodiment 2, the movable electrode 4 is attached to the elastic member 30 through the ring 3 indirectly. When the elastic member 30 is made from an insulating material such as rubber, the movable member 4 can be attached to the elastic member 30 directly.

Embodiment 3

Figure 7:
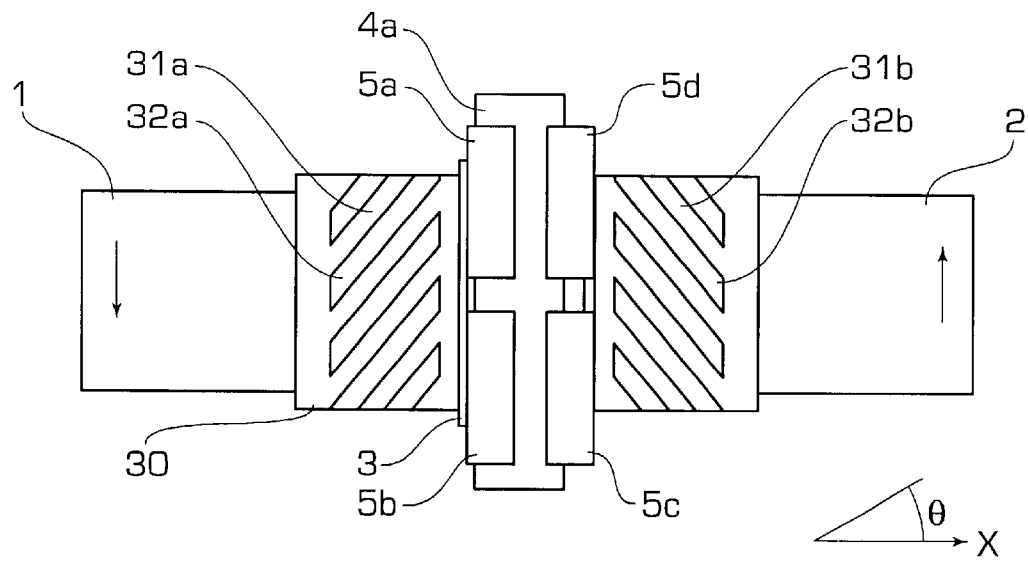
FIG. 7 is a top (plan) view of a torque detector according to Embodiment 3 of the present invention.
Figure 8:
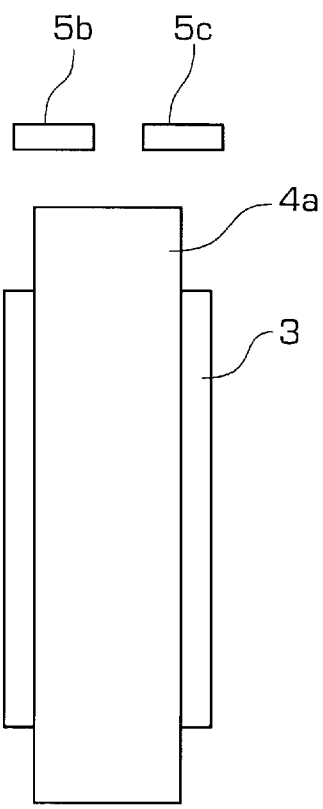
FIG. 8 is a schematic front view of the torque sensor according to Embodiment 3.

In the above embodiments, variable capacitors are formed by making the surface in an axial direction of the movable electrode opposed to the surfaces in an axial direction of the fixed electrodes. AS shown in FIG. 7 and FIG. 8 (FIG. 7 is a top view and FIG. 8 is a substantially front view showing the positional relationship between the movable electrode and the fixed electrodes), a movable electrode 4a having a cylindrical outer surface coaxial to the shafts 1 and 2 is provided and fixed electrodes 5a to 5d are arc electrodes facing the movable electrode 4a with a predetermined gap therebetween. When the movable electrode 4a displaces toward the left side as shown in FIG. 7, the areas of capacitors formed by the fixed electrodes 5a and 5b and the movable electrode 4a increase with the result of growth in capacitance and the areas of capacitors formed by the fixed electrodes 5c and 5d and the movable electrode 4a decrease with the result of a reduction in capacitance. Therefore, the same effect as those of the above embodiments can be obtained.

Embodiment 4

Figure 9:
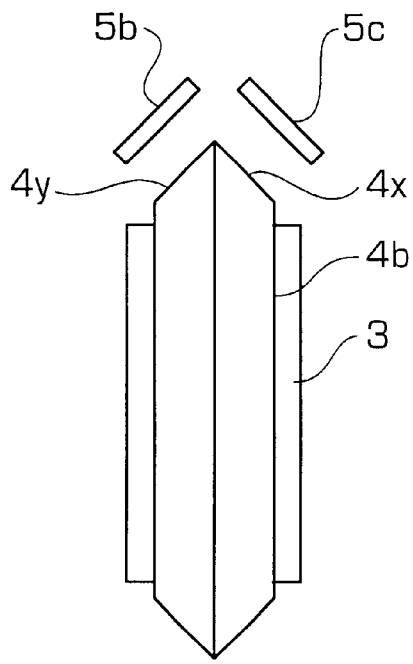
FIG. 9 is a schematic front view of a torque sensor according to Embodiment 4 of the present invention.

As shown in FIG. 9 (substantially front view showing the positional relationship between the movable electrode and the fixed electrodes), a movable electrode 4b whose electrode surfaces are formed by part of a cone having an apex at the center of the axis may be provided. In other words, the movable electrode 4b shaped like the bead of an abacus may be provided and fixed electrodes 5a to 5d may be provided to face the conical surfaces 4x and 4y on both sides of the movable electrode 4b. In this case, the same effect as those of the above embodiments can be obtained.

In the above embodiments, a plurality of fixed electrodes are provided. Capacitance between one movable electrode and one fixed electrode may be detected. For example, there is a musical instrument which changes the interval by varying the floating capacitance of an antenna with moving hands before a single antenna or a case where floating capacitance generated around iron is measured by driving an iron stake into the ground of an oil field. This is the case where a human body or the ground serves as the other electrode. Based on the same principle, capacitance between one movable electrode and one fixed electrode may be detected by arranging the movable electrode and the fixed electrode to face each other.

As described above, according to the present invention, since the fixed electrodes do not turn even when the shafts and the movable electrode turn, a rotary transformer or a slip ring is not required to connect them to the detection circuit. Therefore, a torque detector having a simple structure can be obtained.

Since a magnetic member is not used, the temperature characteristics of the magnetic characteristics of the magnetic member have no influence upon torque detection accuracy. Therefore, a high-accuracy torque detector can be obtained.

Since a third fixed electrode is provided, two receiving circuits can be formed, thereby making possible back-up and the detection of a failure when one of them fails.

Since an elastic member consisting of a first group of elastic columns and a second group of elastic columns is used to support the movable electrode between the first group and the second group of elastic columns directly or indirectly, production becomes easy and costs can be reduced.

What is claimed is:

1. A torque detector for detecting torque which is applied between a first shaft and a second shaft arranged coaxial to each other in such a manner that one end of the first shaft faces one end of the second shaft, the torque detector comprising:

elastic member for connecting the first shaft to the second shaft and generating torsion displacement between the first shaft and the second shaft according to the torque between the first and second shafts;

a ring-shaped movable electrode being not connected to a circuit but being attached to the shafts so that it displaces in an axial direction according to a relative torsion angle between the first and second shafts;

a fixed electrode having a surface, wherein said fixed electrode is installed at a location where the surface of the fixed electrode is opposed to a surface of the movable electrode and the fixed electrode does not turn together with the shafts; and detecting means for detecting capacitance between the fixed electrode and the movable electrode.

2. The torque detector according to claim 1, wherein the elastic member has a first group of elastic columns and a second group of elastic columns, wherein the first group of elastic columns are inclined at a predetermined angle with respect to the first shaft and formed at predetermined intervals on a side where the elastic member is fixed to the first shaft, and;

the second group of elastic columns are inclined at the same predetermined angle in an opposite direction to that of the first group of elastic columns with respect to the second shaft and formed at predetermined intervals on a side where the elastic member is fixed to the second shaft and supports the movable electrode between the first group of elastic columns and the second group of elastic columns directly or indirectly.

3. A torque detector for detecting torque which is applied between a first shaft and a second shaft arranged coaxial to each other in such a manner that one end of the first shaft faces one end of the second shaft, the torque detector comprising:

an elastic member for connecting the first shaft to the second shaft and generating torsion displacement between the first shaft and the second shaft according to the torque between the first and second shafts;

a ring-shaped movable electrode having a surface, wherein said movable electrode is attached to the shafts so that it displaces in an axial direction according to a relative torsion angle between the first and second shafts;

a first fixed electrode having a surface, wherein said first fixed electrode is installed at a location where the surface of the first fixed electrode is opposed to the surface of the movable electrode and the first fixed electrode does not turn together with the shafts;

a second fixed electrode having a surface, wherein said second fixed electrode is installed on a same side as the first fixed electrode of the movable electrode at a location where the surface of the second fixed electrode is opposed to the surface of the movable electrode and the second fixed electrode does not turn together with the shafts; and detecting means for detecting capacitance between the first fixed electrode and the second fixed electrode.

4. The torque detector according to claim 3 which further comprises a third fixed electrode having a surface, wherein said third fixed electrode is installed on a side opposite to the first and second fixed electrodes of the movable electrode at a location where the surface of the third fixed electrode is opposed to the surface of the movable electrode and the third fixed electrode does not turn together with the shafts.

* * * * *